(12) United States Patent
de Silva

(10) Patent No.: US 10,042,568 B2
(45) Date of Patent: Aug. 7, 2018

(54) MEMORY SYSTEM AND OPERATING METHOD THEREOF

(71) Applicant: SK hynix Inc., Gyeonggi-do (KR)

(72) Inventor: Ambrose Gihan de Silva, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/417,407

(22) Filed: Jan. 27, 2017

(65) Prior Publication Data

US 2017/0357458 A1    Dec. 14, 2017

(30) Foreign Application Priority Data

Jun. 8, 2016   (KR) .......................... 10-2016-0070813

(51) Int. Cl.
*G11C 11/34* (2006.01)
*G06F 3/06* (2006.01)

(52) U.S. Cl.
CPC ............ *G06F 3/0619* (2013.01); *G06F 3/065* (2013.01); *G06F 3/0659* (2013.01)

(58) Field of Classification Search
CPC ....... G06F 3/0619; G06F 3/0659; G06F 3/065
See application file for complete search history.

(56) References Cited

U.S. PATENT DOCUMENTS

| 7,788,441 | B2 | 8/2010 | Lee et al. | |
|---|---|---|---|---|
| 8,671,239 | B2 | 3/2014 | Yang et al. | |
| 8,910,002 | B2 | 12/2014 | Schuette | |
| 8,990,483 | B2 | 3/2015 | Kwak | |
| 9,477,590 | B2 | 10/2016 | Post et al. | |
| 2010/0174845 | A1* | 7/2010 | Gorobets ............ | G06F 12/0246 711/103 |
| 2011/0320688 | A1 | 12/2011 | Lee | |
| 2012/0221784 | A1* | 8/2012 | Ban ..................... | G06F 12/0246 711/103 |
| 2012/0290768 | A1* | 11/2012 | Rubowitz ........... | G06F 12/0246 711/103 |
| 2013/0145079 | A1 | 6/2013 | Lee et al. | |

FOREIGN PATENT DOCUMENTS

KR         101080191         11/2011

\* cited by examiner

*Primary Examiner* — Mohammed A Bashar
(74) *Attorney, Agent, or Firm* — IP & T Group LLP

(57) ABSTRACT

A memory system may include: a memory device comprising a plurality of memory blocks, each memory block comprising a plurality of pages; a controller suitable for performing a command operation on the memory blocks, the command operation including checking one or more parameters of each of the memory blocks, selecting at least one source memory block from the memory blocks according to the checked one or more parameters, and storing data stored in the at least one source memory block in a target memory block among the memory blocks.

18 Claims, 9 Drawing Sheets

MEMORY SYSTEM AND OPERATING METHOD THEREOF

CROSS-REFERENCE TO RELATED APPLICATIONS

This U.S. non-provisional patent application claims priority under 35 U.S.C. § 119(a) to Korean Patent Application No. 10-2016-0070813, filed on Jun. 8, 2016 in the Korean Intellectual Property Office (KIPO), the disclosure of which is incorporated herein by reference in its entirety.

BACKGROUND

1. Field

Exemplary embodiments of the present invention relate to a memory system which processes data to a memory device and an operating method thereof.

2. Description of the Related Art

The computer environment paradigm has shifted to ubiquitous computing systems that can be used anytime and anywhere. Due to this fact, use of portable electronic devices such as mobile phones, digital cameras, and notebook computers has rapidly increased. These portable electronic devices generally use a memory system having memory devices, that is, a data storage device. The memory system may be used as a main memory device or an auxiliary memory device of the portable electronic devices.

Memory systems using memory devices provide excellent stability, durability, high information access speed, and low power consumption, since they have no moving parts. Examples of memory systems having such advantages include universal serial bus (USB) memory devices, memory cards having various interfaces, and solid state drives (SSD).

SUMMARY

Various embodiments are directed to a memory system which is capable of minimizing complexity and performance reduction thereof and maximizing the use efficiency of a memory device, thereby rapidly and stably processing data to the memory device, and an operating method thereof.

In an embodiment, a memory system may include: a memory device comprising a plurality of memory blocks, each memory block comprising a plurality of pages; a controller suitable for performing a command operation on the memory blocks, the command operation including checking one or more parameters of each of the memory blocks, selecting at least one source memory block from the memory blocks according to the checked one or more parameters, and storing data stored in the at least one source memory block in a target memory block among the memory blocks.

The one or more parameters may include at least one of a valid page count parameters, an erase count parameters, and an operation parameters of the memory blocks.

The controller may check the number of valid pages among the plurality of pages included in the memory blocks, and then may update the valid page count parameters according to the number of valid pages.

The controller may check a first memory block in which an erase operation was performed, among the memory blocks, according to the erase operation of the command operation, and then may update the erase count parameter of the first memory block.

The controller may check a first memory block in which a program operation or an update program operation was performed, among the memory blocks, according to the program operation or the update program operation of the command operation, and then may update the operation parameter of the first memory block.

The controller may check valid pages corresponding to the valid page count parameters in the memory blocks, may check the maximum value and minimum value of valid data stored in the valid pages, may calculate an average of the valid data, and may select the source memory blocks according to the average value.

The controller may normalize data elements of the valid data for selecting the source memory blocks, may downsample the valid data through the normalization, and may store the down-sampled data in the target memory block.

The controller may sort and may order the valid data according to data addresses, and may store the sorted and ordered data in the target memory block.

The controller may generate a list by writing the parameters of the memory blocks for the respective indexes of the memory blocks, may store the list in a memory of the controller, and may update the parameters written in the list according to the command operation.

The controller may select a first source memory block group from the memory blocks according to a first parameter of the parameters, may select a second source memory block group from the first source memory block group according to a second parameter of the parameters, and may select the source memory blocks from the second source memory block group according to a third parameter of the parameters.

In an embodiment, an operating method of memory system may include: receiving a command from a host, for a plurality of pages included in each of a plurality of memory blocks of a memory device; performing a command operation corresponding to the command between a controller of the memory device and the memory blocks; checking one or more parameters of each of the memory blocks including to the command operation; selecting at least one source memory block from the memory blocks, according to the checked one or more parameters; and storing data stored in the at least one source memory block into a target memory block among the memory blocks.

The one or more parameters may include at least one of a valid page count parameters, an erase count parameters and an operation parameters of the memory blocks.

The operating method may further include: checking the number of valid pages in the plurality of pages included in the memory blocks; and updating the valid page count parameters according to the number of valid pages.

The operating method may further include: checking a first memory block in which an erase operation was performed, among the memory blocks, according to the erase operation of the command operation; and updating the erase count parameter of the first memory block.

The operating method may further include: checking a first memory block in which a program operation or an update program operation was performed, among the memory blocks, according to the program operation or the update program operation of the command operation; and updating the operation parameter of the first memory block.

The selecting of the source memory blocks may include: checking valid pages corresponding to the valid page count parameters in the memory blocks; checking the maximum value and minimum value of valid data stored in the valid pages, and calculating an average of the valid data; and selecting the source memory blocks according to the average value.

The selecting of the source memory blocks may further include normalizing data elements of the valid data for selecting the source memory blocks, and the storing of the data may include down-sampling the valid data through the normalization and storing the down-sampled data in the target memory block.

The storing of the data may include sorting and ordering the valid data according to data addresses, and storing the sorted and ordered data in the target memory block.

The operating method may further include: generating a list by writing the parameters of the memory blocks for the respective indexes of the memory blocks; storing the list in a memory of the controller; and updating the parameters written in the list according to the command operation.

The selecting of the source memory blocks may include: selecting a first source memory block group from the memory blocks according to a first parameter of the parameters; selecting a second source memory block group from the first source memory block group according to a second parameter of the parameters; and selecting the source memory blocks from the second source memory block group according to a third parameter of the parameters.

BRIEF DESCRIPTION OF THE DRAWINGS

Various embodiments of the present invention will be described in reference to the accompanying drawings, wherein.

DETAILED DESCRIPTION

Figure 1:
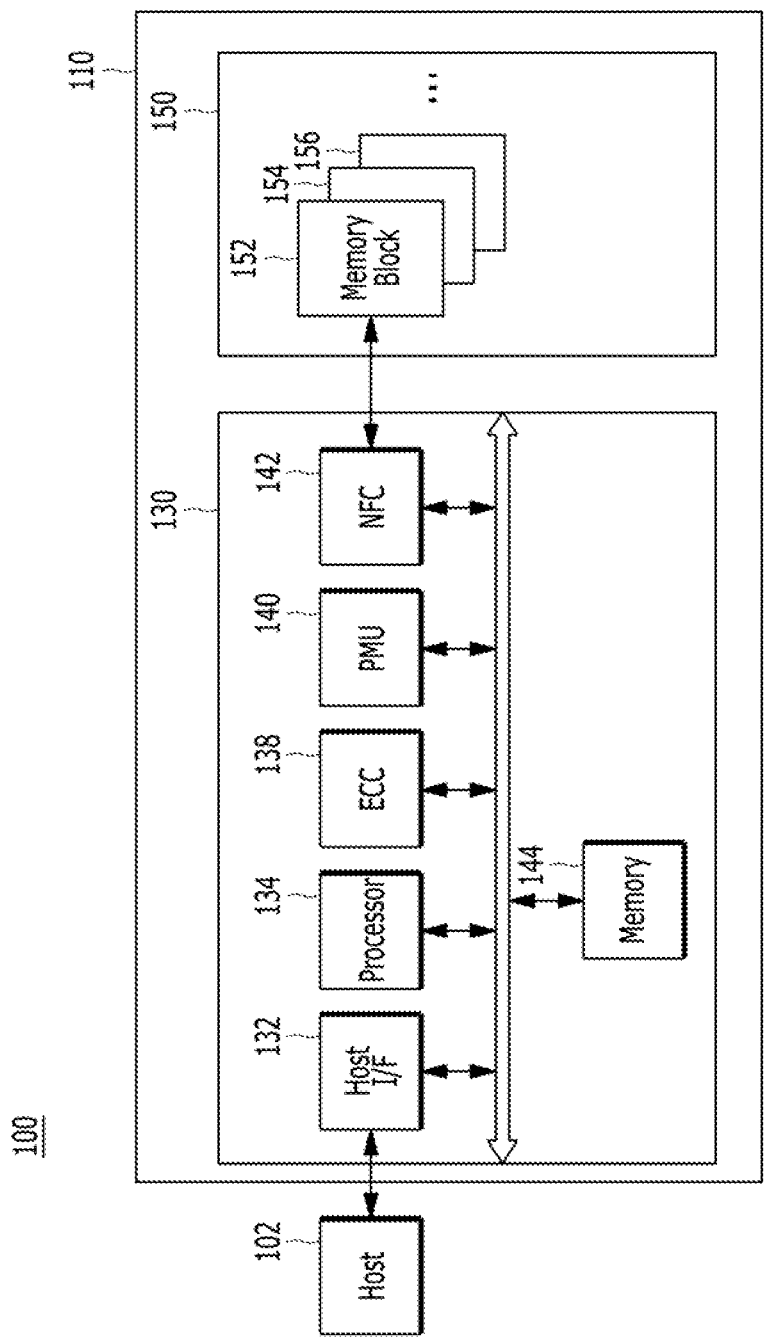
FIG. 1 is a diagram illustrating a data processing system including a memory system, according to an embodiment of the present invention.

Although, various embodiments are described below in more detail with reference to the accompanying drawings, we note that the present invention may, however, be embodied in different forms and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises", "comprising", "includes", and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

FIG. 1 illustrates a data processing system 100 including a memory system 110, according to an embodiment of the present invention.

Referring to FIG. 1, a data processing system 100 may include a host 102 operatively coupled to a memory system 110.

The host 102 may include, for example, a portable electronic device such as a mobile phone, an MP3 player and a laptop computer or a non-portable electronic device such as a desktop computer, a game player, a TV and a projector.

The memory system 110 may operate in response to a request received from the host 102. For example, the memory system 110 may store data to be accessed by the host 102. The memory system 110 may be used as a main memory system or an auxiliary memory system of the host 102. The memory system 110 may be implemented with any one of various storage devices, according to the protocol of a host interface to be coupled electrically with the host 102. The memory system 110 may be implemented with any one of various storage devices, such as, for example, a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, such as, a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (RRAM), and a flash memory.

The memory system 110 may include a memory device 150 for storing data to be accessed by the host 102, and a controller 130 operatively coupled to the memory device 150 for controlling the storage of data in the memory device 150 and the transfer of stored data from the memory device to the host.

The controller 130 and the memory device 150 may be integrated into a single semiconductor device. For instance, the controller 130 and the memory device 150 may be integrated into a single semiconductor device configured as a solid state drive (SSD). When the memory system 110 is used as the SSD, the operation speed of the host 102 that is electrically coupled with the memory system 110 may be significantly increased.

The controller 130 and the memory device 150 may be integrated into a single semiconductor device configured as a memory card, such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

For another instance, the memory system 110 may be configured as part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when power supply to the device is interrupted and, in particular, store the data provided from the host 102 during a write operation, and provide stored data to the host 102 during a read operation. The memory device 150 may include a plurality of memory blocks, for example, memory blocks 152, 154 and 156. Each of the memory blocks 152, 154 and 156 may include a plurality of pages. Each of the pages may include a plurality of memory cells coupled to a word line (WL). The memory device 150 may be a nonvolatile memory device, for example, a flash memory. The flash memory may have a three-dimensional (3D) stack structure. The structure of the memory device 150 and the three-dimensional (3D) stack structure of the memory device 150 will be described later.

The controller 130 of the memory system 110 may control the memory device 150 in response to a request from the host 102. For example, upon receiving a read request from the host 102 the controller 130 may issue a read command and an address to the memory device for reading the data which are stored in the requested address in the memory device and may provide the data read from the memory device 150, to the host 102. Also, in response to a program request (also referred to as a write request) received from the host 102, the controller 130 may issue a write command, an address and write data and may control the operation of the memory device for storing the write data into the memory device 150. The write data are provided from the host 102 to the memory controller together with the write request. To this end, the controller 130 may control one or more operations of the memory device 150 including, for example, a read operation, a write operation and an erase operation. The controller 130 may also control one or more background operations of the memory device 150.

In the illustrated embodiment of FIG. 1, the controller 130 includes a host interface unit 132, a processor 134, an error correction code (ECC) unit 138, a power management unit (PMU) 140, a NAND flash controller (NFC) 142, and a memory 144.

The host interface unit 132 provides an interface between the host and the controller 130. For example, the host interface 132 may receive and process requests, addresses and data provided from the host 102. The host interface may also transmit read data from the memory device to the host. The host interface 132 may communicate with the host 102 through at least one of various well-known interface protocols such as a universal serial bus (USB), a multimedia card (MMC), a peripheral component interconnect-express (PCI- E), a serial attached SCSI (SAS), a serial advanced technology attachment (SATA), a parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fall signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 includes a flash memory and, in particular, when the memory device 150 includes a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read operation, write operation, program operation and erase operation.

The memory 144 may be implemented with volatile memory. The memory 144 may be implemented with a static random access memory (SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and so forth.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

Figure 2:
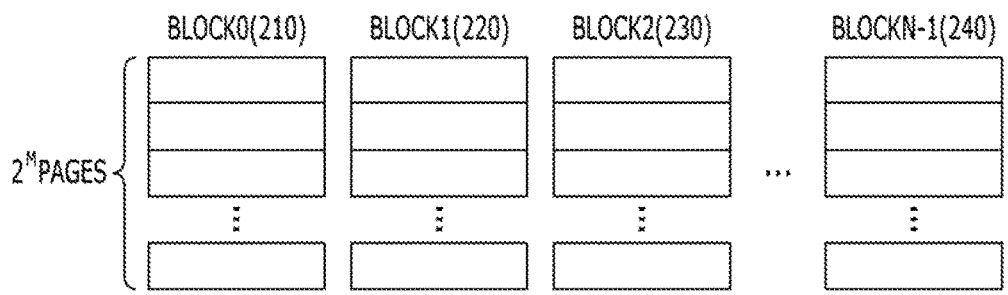
FIG. 2 is a diagram illustrating a memory device employed in the memory system of FIG. 1.

FIG. 2 is a schematic diagram illustrating the memory device 150 of FIG. 1.

Referring to FIG. 2, the memory device 150 may include a plurality of memory blocks, for example, zeroth to (N−1)$^{th}$ blocks 210 to 240. Each of the plurality of memory blocks 210 to 240 may include a plurality of pages, for example, $2^M$ number of pages ($2^M$ PAGES), to which the present invention will not be limited. Each of the plurality of pages may include a plurality of memory cells to which a plurality of word lines are electrically coupled.

Also, the memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. The MLC memory block including a plurality of pages which are implemented with memory cells that are each capable of storing 3-bit data may be defined as a triple level cell (TLC) memory block.

Each of the plurality of memory blocks 210 to 240 may store the data provided from the host device 102 during a write operation, and may provide stored data to the host 102 during a read operation.

Figure 3:
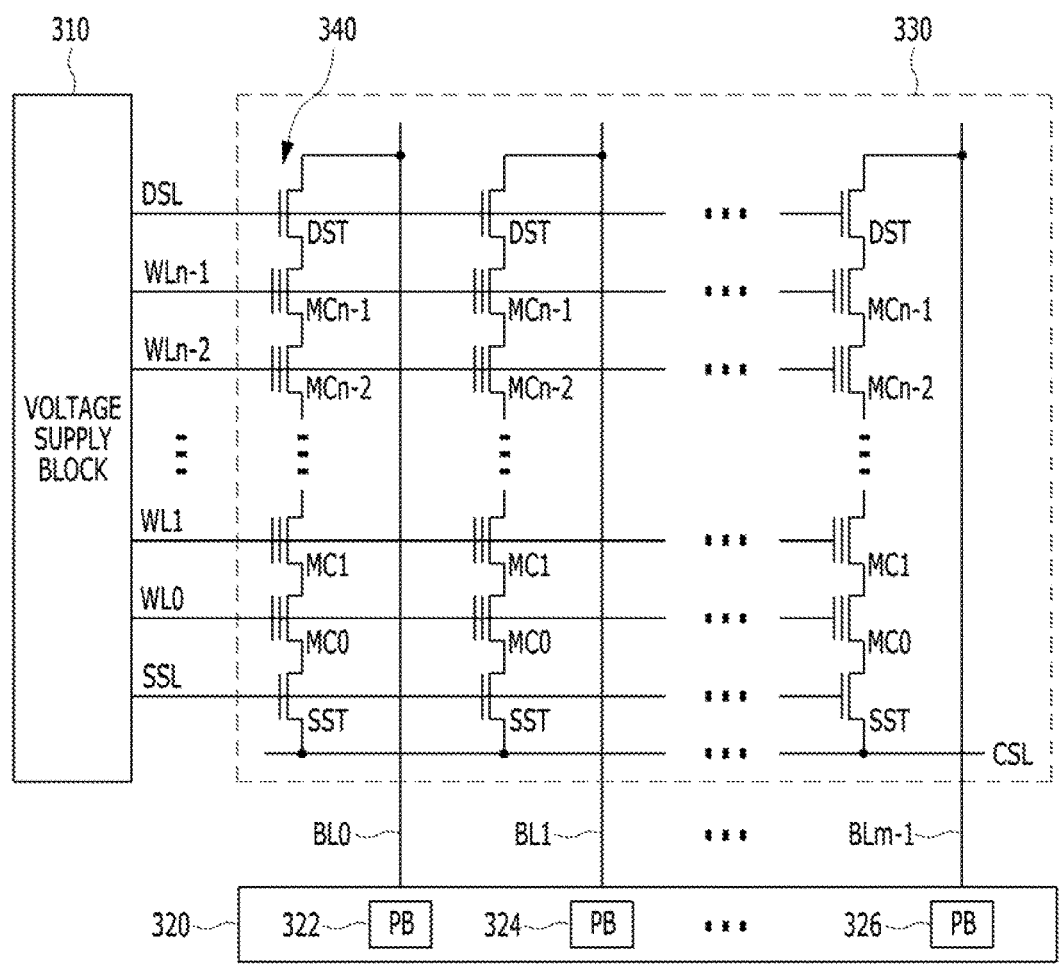
FIG. 3 is a diagram schematically illustrating a memory cell array circuit of a memory block in a memory device, according to an embodiment of the present invention.

FIG. 3 is a circuit diagram illustrating an example of a memory block in a memory device.

Referring to FIG. 3, a memory block 330 of a memory device 300 may include a plurality of cell strings 340 which are realized into a memory cell array and are coupled to bit lines BL0 to BLm−1, respectively. The cell string 340 of each column may include at least one drain select transistor DST and at least one source select transistor SST. A plurality of memory cells or memory cell transistors MC0 to MCn−1 may be coupled in series between the select transistors DST and SST. The respective memory cells MC0 to MCn−1 may be constructed by multi-level cells (MLC) each of which stores a data information of a plurality of bits. The cell strings 340 may be electrically coupled to corresponding bit lines BL0 to BLm−1, respectively. For reference, in FIG. 3, 'DSL' may denote a drain select line, 'SSL' may denote a source select line, and 'CSL' may denote a common source line.

While FIG. 3 shows, as an example, the memory block 330 which is constructed by NAND flash memory cells, it is to be noted that the memory block 330 of the memory device 300 according to the embodiment is not limited to a NAND flash memory and may be realized by a NOR flash memory, a hybrid flash memory in which at least two kinds of memory cells are combined or a one-NAND flash memory in which a controller is built in a memory chip. The operational characteristics of a semiconductor device may be applied to not only a flash memory device in which a charge storing layer is constructed by conductive floating gates but also a charge trap flash (CTF) in which a charge storing layer is constructed by a dielectric layer.

A voltage supply block 310 of the memory device 300 may provide word line voltages (for example, a program voltage, a read voltage and a pass voltage) to be supplied to respective word lines according to an operation mode and voltages to be supplied to bulks (for example, well regions) formed with memory cells. The voltage generating operation of the voltage supply block 310 may be performed by the control of a control circuit (not shown). The voltage supply block 310 may generate a plurality of variable read voltages to generate a plurality of read data, select one of the memory blocks (or sectors) of a memory cell array in response to the control of the control circuit, select one of the word lines of the selected memory block, and provide the word line voltages to the selected word line and unselected word lines.

A read/write circuit 320 of the memory device 300 is controlled by the control circuit, and may operate as a sense amplifier or a write driver according to an operation mode. For example, in the case of a verify/normal read operation, the read/write circuit 320 may operate as a sense amplifier for reading data from the memory cell array. Also, in the case of a program operation, the read/write circuit 320 may operate as a write driver which drives bit lines according to data to be stored in the memory cell array. In the program operation, the read/write circuit 320 may receive data to be written in the memory cell array, from a buffer (not shown), and may drive the bit lines according to inputted data. To this end, the read/write circuit 320 may include a plurality of page buffers (PB) 322, 324 and 326 respectively corresponding to columns (or bit lines) or pairs of columns (or pairs of bit lines), and a plurality of latches (not shown) may be included in each of the page buffers 322, 324 and 326.

Figure 4:
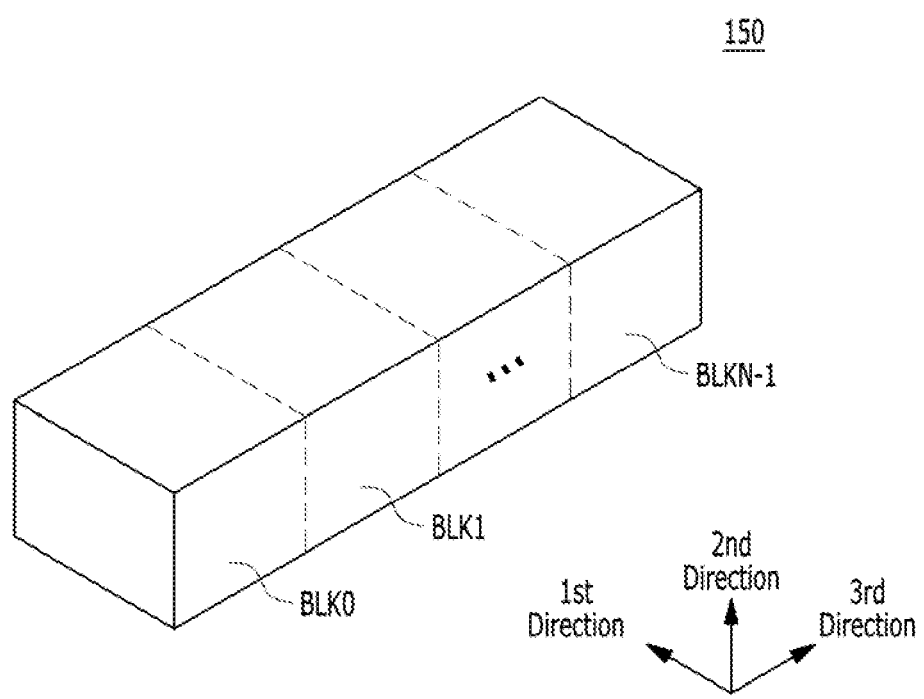
FIG. 4 is a diagram schematically illustrating a structure of a memory device in a memory system, according to an embodiment of the present invention.

Also, the memory device 150 may be realized as a 2-dimensional or 3-dimensional memory device. As shown in FIG. 4, in the case where the memory device 150 is realized as a 3-dimensional nonvolatile memory device, the memory device 150 may include a plurality of memory blocks BLK0 to BLKN−1.

FIG. 4 is a block diagram illustrating the memory blocks of the memory device shown in FIG. 2, and the memory blocks BLK0 to BLKN−1 may be realized as a 3-dimensional structure (or a vertical structure). For example, the respective memory blocks BLK0 to BLKN−1 may be realized as a 3-dimensional structure by including a structure which extends in first to third directions, for example, the x-axis direction, the y-axis direction and the z-axis direction.

The respective memory blocks BLK0 to BLKN−1 included in the memory device 150 may include a plurality of NAND strings which extend in the second direction. The plurality of NAND strings may be provided in the first direction and the third direction. Each NAND string may be coupled to a bit line, at least one string select line, at least one ground select line, a plurality of word lines, at least one dummy word line and a common source line, and may include a plurality of transistor structures.

Namely, among the plurality of memory blocks BLK0 to BLKN−1 of the memory device 150, the respective memory blocks BLK0 to BLKN−1 may be coupled to a plurality of bit lines, a plurality of string select lines, a plurality of ground select lines, a plurality of word lines, a plurality of dummy word lines and a plurality of common source lines, and accordingly, may include a plurality of NAND strings. Also, in the respective memory blocks BLK0 to BLKN−1, a plurality of NAND strings may be coupled to one bit line, and a plurality of transistors may be realized in one NAND string. A string select transistor of each NAND string may be coupled to a corresponding bit line, and a ground select transistor of each NAND string may be coupled to the common source line. Memory cells may be provided between the string select transistor and the ground select transistor of each NAND string. Namely, in the plurality of memory blocks BLK0 to BLKN−1 of the memory device 150, a plurality of memory cells may be realized in each of the memory blocks BLK0 to BLKN−1.

Hereafter, a data processing operation to a memory device in a memory system according to an embodiment of the present invention will be described in more detail with reference to FIGS. 5 and 6. More particularly a data processing operation to the memory device 150 through a command operation corresponding to a request received from the host 102 will be described in more detail with reference to FIGS. 5 and 6.

Figure 5:
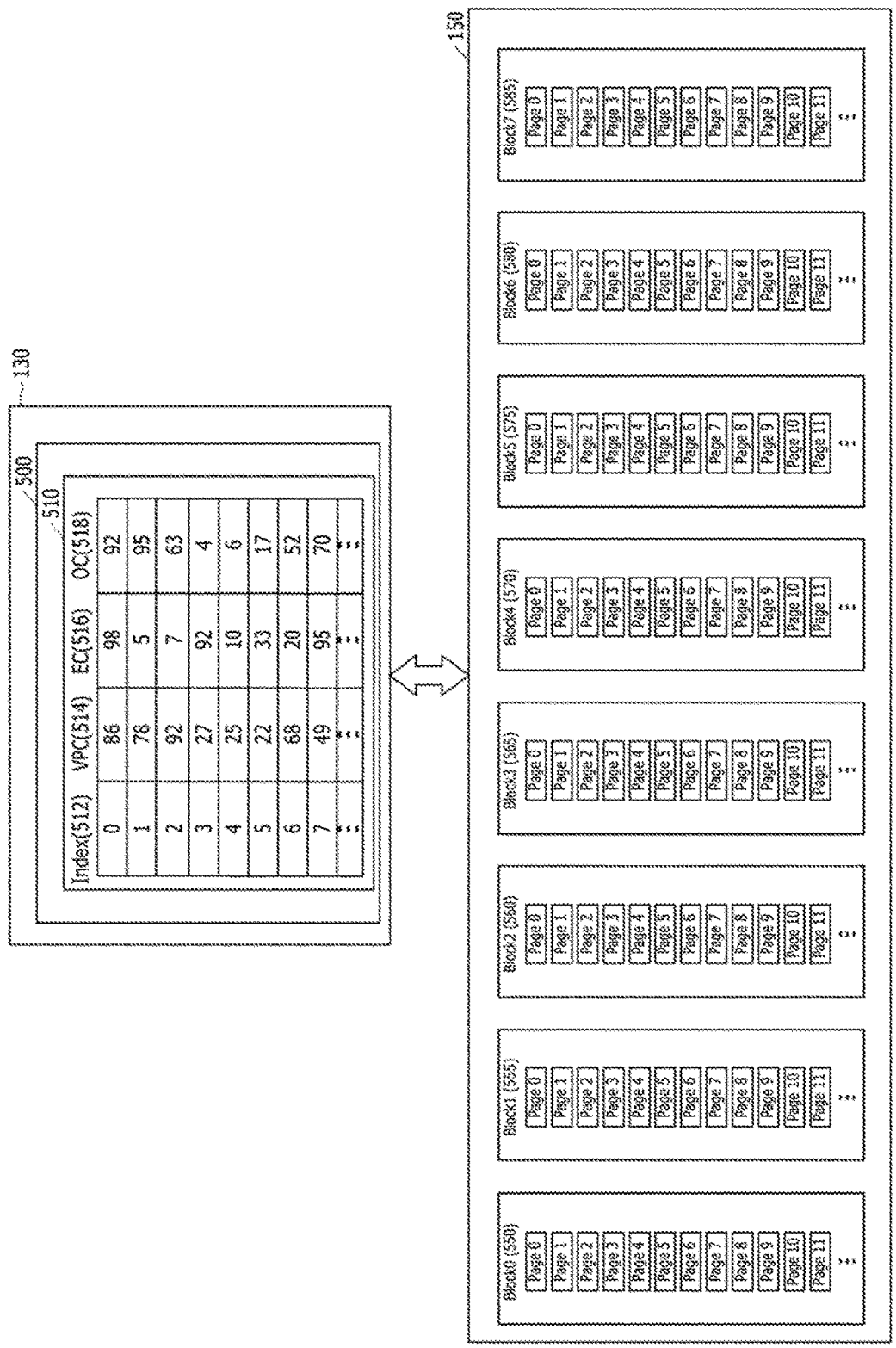
FIG. 5 is a diagram schematically describing a data processing operation to a memory device in a memory system, according to an embodiment of the present invention.

FIG. 5 is a diagram schematically describing an example of a data processing operation to a memory device in a memory system according to an embodiment. In a data processing operation, the memory system 110 illustrated in FIG. 1 may receive a write command and erase command from the host 102, store data corresponding to the write command in a buffer/cache included in the memory 144 of the controller 130, and program the data stored in the buffer/cache to the corresponding memory blocks of the memory device 150. Furthermore, the memory system 110 may update the data programmed in the memory device 150, reprogram the updated data to the plurality of memory blocks of the memory device, and perform an erase operation on memory blocks of the memory device 150, the memory blocks corresponding to the erase command.

Each of the memory blocks included in the memory device 150 may have a limited erase count (EC). Thus, the memory block may perform an erase operation corresponding to an erase command within the limited EC. When an erase operation of a specific memory block is performed in a state where the EC thereof exceeded the limited EC, the specific memory block may be processed into a bad block which cannot be used any more. That is, the limited EC may indicate the maximum count at which erase operations can be performed on memory blocks of the memory device 150. In the present embodiment, the memory system may perform an operation of processing data among the memory blocks of the memory device 150, for example, a wear-leveling operation so that erase operations can be uniformly performed on the memory blocks of the memory device 150 within the limited EC. In particular, the memory system may perform a wear-leveling operation in consideration of the ECs of the memory blocks of the memory device 150.

In the present embodiment, a configuration in which a data processing operation of the memory system is performed by the controller 130 will be taken as an example for description. As described above, however, the processor 134 included in the controller 130 may perform a data processing operation through a FTL, for example. The controller 130 may perform a program operation and erase operation corresponding to a write command and erase command received from the host 102. The controller 130 may process data between the memory blocks in consideration of the parameters of the memory blocks. For example, the controller 130 may perform a wear-leveling operation by swapping data between the memory blocks in consideration of the ECs of the memory blocks. The controller 130 may select source memory blocks and target memory blocks from the memory blocks in consideration of the ECs of the memory blocks, store data stored in the source memory blocks in the target memory blocks, and perform an erase operation on the source memory blocks.

In the present embodiment, the ECs which are updated when an erase operation is performed on the memory blocks according to an erase command may be used as the parameters of the memory blocks, in order to perform a wear-leveling operation on the memory blocks. However, the controller 130 may perform a wear-leveling operation on the memory blocks in consideration of the Program/Erase (P/E) cycles or Erase/Write (E/W) cycles of the memory blocks.

Furthermore, the controller 130 may store data corresponding to a write command received from the host 102 in a buffer included in the memory 144 of the controller 130, and program the data stored in the buffer to a plurality of pages of an arbitrary memory block among the plurality of memory blocks included in the memory device 150. For example, the controller 130 may program and store the data into a first page of a first memory block. Then, when receiving a write command for the data stored in the first page of the first memory block from the host 102, the controller 130 may perform a program operation for the data stored in the first page of the first memory block. In other words, the controller 130 may store write data corresponding to the write command received from the host 102 in other pages of an arbitrary memory block, for example, a second page of the first memory block or pages of another arbitrary block, for example, a first page of a second memory block. At this time, the controller 130 may process the data stored in the page of the previous memory block or the first page of the first memory block into invalid data. Thus, the first page of the first memory block may become an Invalid page.

In the present embodiment, when invalid pages are included in the memory blocks of the memory device 150, an operation of processing data between the memory blocks of the memory device 150, for example, garbage collection (GC) may be performed in order to maximize the use efficiency of the memory device 150. The controller 130 may copy and store data between memory blocks in consideration of Invalid pages in memory blocks in which program is completed, among the memory blocks of the memory device 150, or memory blocks of which all the pages are written, that is, closed memory blocks in which data are programmed. The controller 130 may copy and store data of valid pages included in the memory blocks, that is, valid data into a memory block having no data programmed therein, for example, an empty memory block. In other words, the controller 130 may perform a garbage collection operation on the memory blocks of the memory device 150.

At this time, the controller 130 may check valid pages of the memory blocks of the memory device 150, and perform a garbage collection operation according to the parameters of the memory blocks, for example, Valid Page Counts (VPCs), thereby generating an empty memory block. During the garbage collection operation, the controller 130 may select source memory blocks by considering the parameters of closed memory blocks among the memory blocks included in the memory device 150, for example, the VPCs of the closed memory blocks, copy and store valid data of the source memory blocks into a target memory block, for example, an empty memory block of which all pages are not programmed, and then perform an erase operation on the source memory blocks, thereby processing the source memory blocks into empty memory blocks, open memory blocks or free memory blocks.

In the present embodiment, when the controller 130 stores data corresponding to a write command received from the host 102 into an arbitrary memory block, for example, a first memory block among the plurality of memory blocks included in the memory device 150 or receives a write command for data stored in the first memory block from the host 102 and stores the data stored in the first memory block into a plurality of memory blocks, for example, the first memory block or another memory block, the controller 130 may update an Operation Count (OC) of the first memory block. That is, when a command operation corresponding to a write command received from the host 102 is performed in memory blocks, only the OCs of the respective memory blocks in which the command operation is performed may be updated. In particular, considering the parameters of the memory blocks of the memory device 150, for example, the OCs of the memory blocks, the controller 130 may select source memory blocks, copy and store valid data of the source memory blocks into a target memory block, and then perform an erase operation on the source memory blocks.

As a program operation for memory blocks is performed to store data in the memory blocks or an update program operation for the data is performed, the controller 130 may update the OCs of the memory blocks. The controller 130 may select source memory blocks among the memory blocks of the memory device 150 in consideration of the OCs of the memory blocks. Hereafter, the data processing operation of the memory system will be described in more detail with reference to FIG. 5.

First, referring to FIG. 5, the controller 130 may store data corresponding to a write command received from the host 102 in a buffer included in the memory 144 of the controller 130, and program the data stored in the buffer to a memory block among the plurality of memory blocks included in the memory device 150, for example, a memory block 0 (550), a memory block 1 (555), a memory block 2 (560), a memory block 3 (565), a memory block 4 (570), a memory block 5 (575), a memory block 6 (580) and a memory block 7 (585).

As described above, each of the memory blocks included in the memory device 150 may include a plurality of pages. When updating and programming data stored in the memory blocks of the memory device 150, the controller 130 may check valid pages of the memory blocks in response to the update program operation, and a valid page count VPC 514 indicating the number of valid pages in each of the memory blocks may be included in a list 510. The controller 130 may write the VPCs 514 of the memory blocks to the list 510 with indexes 512 indicating the respective memory blocks of the memory device 150, select a source memory block among the memory blocks in consideration of the VPCs 514 of the memory blocks in the list 510, copy and store valid data of the source memory block into a target memory block, and then perform an erase operation on the source memory block to generate an empty memory block (also referred to as a free memory block).

In an embodiment, the controller 130 may check the valid pages of closed memory blocks (i.e., memory blocks having no available memory space for programming) among the plurality of memory blocks included in the memory device 150. For example, assuming that the memory block 0 (550), the memory block 1 (555), the memory block 2 (560), the memory block 3 (565), the memory block 4 (570), the memory block 5 (575), the memory block 6 (580) and the memory block 7 (585) are all closed blocks the controller 130 may check their valid pages and write their VPCs 514 at the respective indexes 512 for generating the list 510.

Then, the controller 130 may store the list 510 in a buffer 500 which may be included in the memory 144.

As illustrated in FIG. 5, in the list 510, the VPC 514 for the index 512 '0' of the memory block 0 (550) may be '86', the VPC 514 for the index 512 '1' of the memory block 1 (555) may be '78', the VPC 514 for the index 512 '2' of the memory block 2 (560) may be '92', the VPC 514 for the index 512 '3' of the memory block 3 (565) may be '27', the VPC 514 for the index 512 '4' of the memory block 4 (570) may be '25', the VPC 514 for the Index 512 '5' of the memory block 5 (575) may be '22', the VPC 514 for the index 512 '6' of the memory block 6 (580) may be '68', and the VPC 514 for the index 512 '7' of the memory block 7 (585) may be '49'.

When performing a garbage collection operation on the memory block 0 (550), the memory block 1 (555), the memory block 2 (560), the memory block 3 (565), the memory block 4 (570), the memory block 5 (575), the memory block 6 (580) and the memory block 7 (585), the controller 130 may check at least one parameter of each of the memory blocks and select at least one source memory block by considering the at least one parameter of the memory blocks 550, 555, 560, 565, 570, 575, 580 and 585. For example, the at least one parameter may be the VPC of each memory block, and the controller 130 may check the VPC's 514 of the memory blocks 550, 555, 560, 565, 570, 575, 580 and 585 from the list 510 and select at least one source memory block based on the checked VPCs 514. For example, the controller 130 may select memory blocks of which the VPCs 514 are smaller than a minimum VPC (also referred to as a threshold VPC), among the memory blocks 550, 555, 560, 565, 570, 575, 580 and 585, as the source memory blocks.

In an embodiment, the controller 130 may check the maximum and minimum values of the VPCs 514 stored in the list 510, calculate an average VPC based on the maximum and minimum VPCs 514 and use this average VPC as a threshold VPC for selecting the source memory blocks among the memory blocks 550, 555, 560, 565, 570, 575, 580 and 585. Alternatively, the controller 130 may calculate an average VPC based on all the VPCs 514 and use this average VPC as a threshold VPC for selecting the source memory blocks among the memory blocks 550, 555, 560, 565, 570, 575, 580 and 585, in the list 510, that is, valid data and then calculate the average of the valid data. In other words, the controller 130 may check the maximum value and minimum value of the valid data stored in the memory blocks 550, 555, 560, 565, 570, 575, 580 and 585, calculate the average of the valid data, and select source memory blocks among the memory blocks 550, 555, 560, 565, 570, 575, 580 and 585 in consideration of the average of the valid data. The controller 130 may normalize data elements of the valid data of the respective memory blocks 550, 555, 560, 565, 570, 575, 580 and 585, using a preset normalization factor. The controller 130 may select source memory blocks among the memory blocks 550, 555, 560, 565, 570, 575, 580 and 585, in consideration of the data elements of the valid data, which are normalized for the respective memory blocks 550, 555, 560, 565, 570, 575, 580 and 585. The controller 130 may normalize data elements of the valid data of the respective memory blocks 550, 555, 560, 565, 570, 575, 580 and 585, using a preset normalization factor. The controller 130 may select source memory blocks among the memory blocks 550, 555, 560, 565, 570, 575, 580 and 585, in consideration of the data elements of the valid data, which are normalized for the respective memory blocks 550, 555, 560, 565, 570, 575, 580 and 585.

In an embodiment, the controller 130 may normalize and down-sample the data elements of the valid data stored in the source memory blocks, copy and store the down-sampled valid data of the source memory blocks into the target memory block, and store data from which unnecessary data are discarded, into the target memory block. The controller 130 may sort and order the valid data stored in the source memory blocks according to data addresses, and store the sorted and ordered data in the target memory block.

The controller 130 may check an erase command received from the host 102, and perform an erase operation on an arbitrary block among the plurality of memory blocks included in the memory device 150, for example, the memory block 0 (550), the memory block 1 (555), the memory block 2 (560), the memory block 3 (565), the memory block 4 (570), the memory block 5 (575), the memory block 6 (580) and the memory block 7 (585). At this time, the controller 130 may update the EC 516 of the arbitrary block on which the erase operation was performed. The ECs 516 of the memory blocks 550, 555, 560, 565, 570, 575, 580 and 585 included in the memory device 150 may be updated and then written to the list 510, and the list 510 having the ECs 516 written therein may be stored in the memory 144 of the controller 130.

The controller 130 may check an erase command received from the host 102, and then perform an erase operation on a memory block corresponding to the erase command, among the memory blocks 550, 555, 560, 565, 570, 575, 580 and 585 of the memory device 150. As erase operations for the memory blocks 550, 555, 560, 565, 570, 575, 580 and 585 of the memory device 150 are performed, the controller 130 may update the ECs 516 of the respective memory blocks 550, 555, 560, 565, 570, 575, 580 and 585 and write the updated ECs 516 to the list 510. That is, as the erase operations for the memory blocks 550, 555, 560, 565, 570, 575, 580 and 585 of the memory device 150 are performed, the controller 130 may update the ECs 516 written in the list 510 stored in the memory 144 of the controller 130.

For example, the controller 130 may check the ECs 516 of the memory blocks included in the memory device 150, that is, the memory block 0 (550), the memory block 1 (555), the memory block 2 (560), the memory block 3 (565), the memory block 4 (570), the memory block 5 (575), the memory block 6 (580) and the memory block 7 (585), and write the ECs 516 of the memory block 0 (550), the memory block 1 (555), the memory block 2 (560), the memory block 3 (565), the memory block 4 (570), the memory block 5 (575), the memory block 6 (580) and the memory block 7 (585) to the list 510 at the respective indexes 512 indicating the memory block 0 (550), the memory block 1 (555), the memory block 2 (560), the memory block 3 (565), the memory block 4 (570), the memory block 5 (575), the memory block 6 (580) and the memory block 7 (585).

In the list 510, the EC 516 for the index 512 '0' of the memory block 0 (550) may be '98', the EC 516 for the index 512 '1' of the memory block 1 (555) may be '5', the EC 516 for the index 512 '2' of the memory block 2 (560) may be '7', the EC 516 for the index 512 '3' of the memory block 3 (565) may be '92', the EC 516 for the index 512 '4' of the memory block 4 (570) may be '10', the EC 516 for the Index 512 '5' of the memory block 5 (575) may be '33', the EC 516 for the index 512 '6' of the memory block 6 (580) may be '20', and the EC 516 for the index 512 '7' of the memory block 0 (585) may be '95'.

When performing a wear-leveling operation on the memory block 0 (550), the memory block 1 (555), the memory block 2 (560), the memory block 3 (565), the memory block 4 (570), the memory block 5 (575), the memory block 6 (580) and the memory block 7 (585) of the memory device 150, the controller 130 may check the parameters of the memory block 0 (550), the memory block 1 (555), the memory block 2 (560), the memory block 3 (565), the memory block 4 (570), the memory block 5 (575), the memory block 6 (580) and the memory block 7 (585), and perform a wear-leveling operation for selecting source memory blocks in consideration of the ECs 516 of the memory block 0 (550), the memory block 1 (555), the memory block 2 (560), the memory block 3 (565), the memory block 4 (570), the memory block 5 (575), the memory block 6 (580) and the memory block 7 (585) in the list 510 stored in the buffer 500. For example, the controller 130 may select memory blocks of which the ECs 516 are smaller than the minimum EC or threshold EC, among the memory blocks 550, 555, 560, 565, 570, 575, 580 and 585, as the source memory blocks.

The controller 130 may store data corresponding to a write command received from the host 102 in a buffer included in the memory 144 of the controller 130, and program the data stored in the buffer to the plurality of memory blocks included in the memory device 150, for example, the memory block 0 (550), the memory block 1 (555), the memory block 2 (560), the memory block 3 (565), the memory block 4 (570), the memory block 5 (575), the memory block 6 (580) and the memory block 7 (585). The controller 130 may perform a program operation on the memory blocks 550, 555, 560, 565, 570, 575, 580 and 585 or perform an update program operation on the data stored in the memory blocks 550, 555, 560, 565, 570, 575, 580 and 585, in response to a write command received from the host 102. At this time, the controller 130 may update the OCs 518 of the memory blocks 550, 555, 560, 565, 570, 575, 580 in which the program operation or the update program operation was performed. The OCs 518 of the memory blocks 550, 555, 560, 565, 570, 575, 580 and 585 included in the memory device 150 may be updated and then written to the list 510, and the list 510 having the OCs 518 written therein may be stored in the memory 144 of the controller 130.

The controller 130 may check the write command received from the host 102, and perform a program operation or update program operation on a memory block corresponding to the write command among the memory blocks 550, 555, 560, 565, 570, 575, 580 of the memory device 150. As the program operation or update program operation is performed on the memory blocks 550, 555, 560, 565, 570, 575, 580 of the memory device 150, the controller 130 may update the OCs 518 of the memory blocks 550, 555, 560, 565, 570, 575, 580 and 585, and write the updated OCs 518 to the list 510. That is, as the program operation or update program operation is performed on the memory blocks 550, 555, 560, 565, 570, 575, 580, the controller 130 may update the OCs 518 written in the list 510 stored in the memory 144 of the controller 130.

For example, the controller 130 may check the OCs 518 of the memory blocks included in the memory device 150, for example, the memory block 0 (550), the memory block 1 (555), the memory block 2 (560), the memory block 3 (565), the memory block 4 (570), the memory block 5 (575), the memory block 6 (580) and the memory block 7 (585), and write the OCs 518 of the memory block 0 (550), the memory block 1 (555), the memory block 2 (560), the memory block 3 (565), the memory block 4 (570), the memory block 5 (575), the memory block 6 (580) and the memory block 7 (585) to the list 510 at the respective indexes 512 indicating the memory block 0 (550), the memory block 1 (555), the memory block 2 (560), the memory block 3 (565), the memory block 4 (570), the memory block 5 (575), the memory block 6 (580) and the memory block 7 (585).

In the list 510, the OC 518 for the Index 512 '0' of the memory block 0 (550) may be '92', the OC 518 for the index 512 '1' of the memory block 1 (555) may be '95', the OC 518 for the index 512 '2' of the memory block 2 (560) may be '63', the OC 518 for the index 512 '3' of the memory block 3 (565) may be '4', the OC 518 for the index 512 '4' of the memory block 4 (570) may be '6', the OC 518 for the index 512 '5' of the memory block 5 (575) may be '17', the OC 518 for the index 512 '6' of the memory block 6 (580) may be '52', and the OC 518 for the index 512 '7' of the memory block 0 (585) may be '70'.

When performing a wear-leveling operation on the memory block 0 (550), the memory block 1 (555), the memory block 2 (560), the memory block 3 (565), the memory block 4 (570), the memory block 5 (575), the memory block 6 (580) and the memory block 7 (585) of the memory device 150, the controller 130 may check the parameters of the memory block 0 (550), the memory block 1 (555), the memory block 2 (560), the memory block 3 (565), the memory block 4 (570), the memory block 5 (575), the memory block 6 (580) and the memory block 7 (585), and perform a wear-leveling operation for selecting source memory blocks in consideration of the OCs 518 of the memory block 0 (550), the memory block 1 (555), the memory block 2 (560), the memory block 3 (565), the memory block 4 (570), the memory block 5 (575), the memory block 6 (580) and the memory block 7 (585) in the list 510 stored in the buffer 500. For example, the controller 130 may select memory blocks of which the OCs 518 are smaller than the minimum OC or threshold OC, among the memory blocks 550, 555, 560, 565, 570, 575, 580 and 585, as the source memory blocks. Hereafter, the operation of the controller 130 for selecting source memory blocks among the memory blocks 550, 555, 560, 565, 570, 575, 580 and 585 in consideration of the parameters of the plurality of memory blocks included in the memory device 150, that is, the memory block 0 (550), the memory block 1 (555), the memory block 2 (560), the memory block 3 (565), the memory block 4 (570), the memory block 5 (575), the memory block 6 (580) and the memory block 7 (585) will be described in more detail.

That is, the controller 130 may write the parameters of the memory blocks 550, 555, 560, 565, 570, 575, 580 and 585 included in the memory device 150 or the VPCs 514, the ECs 516 and the OCs 518 to the list 510, and select source memory blocks among the memory blocks 550, 555, 560, 565, 570, 575, 580 in consideration of the VPCs 514, the ECs 516 and the OCs 518 written in the list 510. The controller 130 may select a first source memory block group in consideration of the first parameters of the memory blocks 550, 555, 560, 565, 570, 575, 580 and 585, for example, the ECs 516. At this time, the controller 130 may select memory blocks having the minimum EC or memory blocks having a smaller EC than the threshold EC as the first source memory block group. For example, when the threshold EC is '15', the controller 130 may select the memory block 1 (555), the memory block 2 (560) and the memory block 4 (570), which have a smaller EC than the threshold EC in the list 510, as the first source memory block group.

The controller 130 may select a second source memory block group by considering the second parameters of the first source memory block group selected in consideration of the first parameters, that is, the memory block 1 (555), the memory block 2 (560) and the memory block 4 (570), for example, the OCs 518. At this time, the controller 130 may select memory blocks having the minimum OC or memory blocks having a smaller OC than the threshold OC as the second source memory block group. For example, when the threshold OC is '70', the controller 130 may select the memory block 2 (560) and the memory block 4 (570), which have a smaller OC than the threshold OC in the list 510, as the second source memory block group.

The controller 130 may select source memory blocks by considering the third parameters of the second source memory block group selected in consideration of the second parameters, that is, the memory block 2 (560) and the memory block 4 (570), for example, the VPCs 514. At this time, the controller 130 may select memory blocks having the minimum VPC or memory blocks having a smaller VPC than the threshold VPC as the source memory blocks. For example, when the threshold VPC is '30', the controller 130 may select the memory block 4 (570) having a smaller VPC than the threshold VPC as the source memory block.

After selecting the memory block 4 (570) as the source memory block among the memory blocks 550, 555, 560, 565, 570, 575, 580 and 585 of the memory device 150, the controller 130 may copy and store data stored in the memory block 4 (570) selected as the source memory block or particularly data stored in valid pages corresponding to the VPC 514 written in the list 510, that is, valid data of the memory block 4 (570) into a target memory block, and perform an erase operation on the memory block 4 (570) serving as the source memory block.

At this time, the controller 130 may check the maximum value and the maximum value of the valid data of the memory block 4 (570), calculate the average of the valid data, and normalize data elements of the valid data using a normalization factor. The controller 130 may down-sample the valid data of the memory block 4 (570), and store the down-sampled valid data in the target memory block. At this time, the controller 130 may sort and order the valid data according to data addresses, and store the sorted and ordered data in the target memory block. Furthermore, as the erase operation is performed on the memory block 4 (570), the controller 130 may update the EC 516 of the memory block 4 (570) in the list 510, and the memory block 4 (570) may become an empty memory block.

Figure 6:
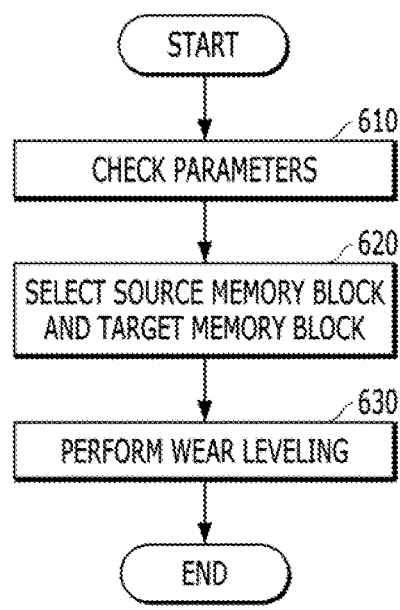
FIG. 6 is a flowchart schematically illustrating a data processing operation in a memory system, according to an embodiment of the present invention.

Referring now to FIG. 6, a data processing operation in a memory system, according to an embodiment will be described in more detail. Accordingly, the memory system may check the parameters of the memory blocks included in the memory device at step 610. For example, in an embodiment the memory system may check at least one of the VPCs, the ECs and the OCs of each of the memory blocks which are stored in the list 510 of FIG. 5. The memory system may check a plurality of the parameters for each of the memory blocks which are listed in the list 510. In an embodiment, the memory system may only check the parameters of all the closed memory blocks included in the memory device. In another embodiment, the memory system may check the parameters of only all the closed memory blocks included in the memory device.

At step 620, the memory system may select a source memory block and a target memory block among the memory blocks included in the memory device. In particular, the memory system may select a source memory block among the memory blocks by considering the parameters of the respective memory blocks or the VPCs, the ECs and the OCs and comparing them with respective threshold values for these parameters as described earlier. The memory system may select one or more source memory blocks among the memory blocks by considering at least one of the parameters of the respective memory blocks stored in the list 510, for example, the VPCs, the ECs and the OCs of the memory blocks. Likewise, the memory system may select one or more target memory blocks as may be needed depending upon the number of selected source memory blocks.

At step 630, the memory system may perform wear leveling on the memory blocks. In particular, the memory system may copy and store the data stored in the source memory blocks or particularly valid data stored in the valid pages of the source memory blocks into the target memory block, and then perform an erase operation on the source memory blocks.

The configuration in which the memory system checks the parameters of the memory blocks, for example, the VPCs, the ECs and the OCs, selects the source memory blocks by considering the parameters of the memory blocks or particularly the VPCs, the ECs and the OCs, copies and stores data stored in the source memory blocks into the target memory block and then perform an erase operation on the source memory blocks has been described in detail with reference to FIG. 5. Thus, the detailed descriptions thereof are omitted herein. Hereafter, a data processing system and electronic devices to which the memory system 110 including the memory device 150 and the controller 130 and described with reference to FIGS. 1 to 6 according to the present embodiment is applied will be described in more detail with reference to FIGS. 7 to 12.

Figure 7:
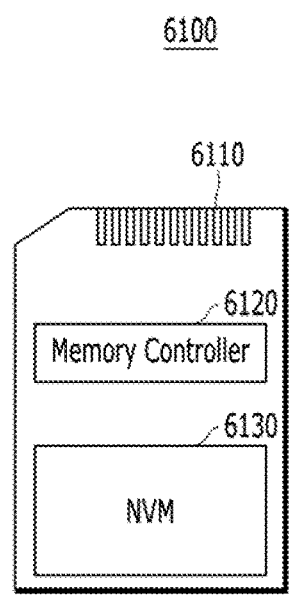
FIG. 7 is a diagram illustrating a memory card system, according to an embodiment of the present invention.

FIG. 7 is a diagram illustrating a data processing system including the memory system according to the embodiment. FIG. 7 is a diagram illustrating a memory card system, according to an embodiment of the present invention.

Referring to FIG. 7, a memory card system 6100 includes a memory controller 6120, a memory device 6130, and a connector 6110.

In detail, the memory controller 6120 may be connected with the memory device 6130 and may access the memory device 6130. In some embodiments, the memory device 6130 may be implemented with a nonvolatile memory (NVM). For example, the memory controller 6120 may control read, write, erase and background operations for the memory device 6130. The memory controller 6120 may provide an interface between the memory device 6130 and a host (not shown), and may drive a firmware for controlling the memory device 6130. For example, the memory controller 6120 may correspond to the controller 130 in the memory system 110 described above with reference to FIG. 1, and the memory device 6130 may correspond to the memory device 150 in the memory system 110 described above with reference to FIG. 1.

Therefore, the memory controller 6120 may include components such as a random access memory (RAM), a processing unit, a host interface, a memory interface and an error correction unit as shown in FIG. 1.

The memory controller 6120 may communicate with an external device (for example, the host 102 described above with reference to FIG. 1), through the connector 6110. For example, as described above with reference to FIG. 1, the memory controller 6120 may be configured to communicate with the external device through at least one of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (ESDI), Integrated Drive Electronics (IDE), Firewire, universal flash storage (UFS), wireless-fidelity (WI-FI) and Bluetooth. Accordingly, the memory system and the data processing system according to the embodiment may be applied to wired/wireless electronic appliances, For example, a mobile electronic appliance.

The memory device 6130 may be implemented with a nonvolatile memory. For example, the memory device 6130 may be implemented with various nonvolatile memory devices such as an electrically erasable and programmable ROM (EPROM), a NAND flash memory, a NOR flash memory, a phase-change RAM (PRAM), a resistive RAM (ReRAM), a ferroelectric RAM (FRAM) and a spin torque transfer magnetic RAM (STT-MRAM).

The memory controller 6120 and the memory device 6130 may be integrated into a single semiconductor device. For example, the memory controller 6120 and the memory device 6130 may construct a solid state driver (SSD) by being integrated into a single semiconductor device. The memory controller 6120 and the memory device 6130 may construct a memory card such as a PC card (PCMCIA: Personal Computer Memory Card International Association), a compact flash card (CF), a smart media card (SM and SMC), a memory stick, a multimedia card (MMC, RS-MMC, MMCmicro and eMMC), an SD card (e.g., SD, miniSD, microSD and SDHC) and a universal flash storage (UFS).

Figure 8:
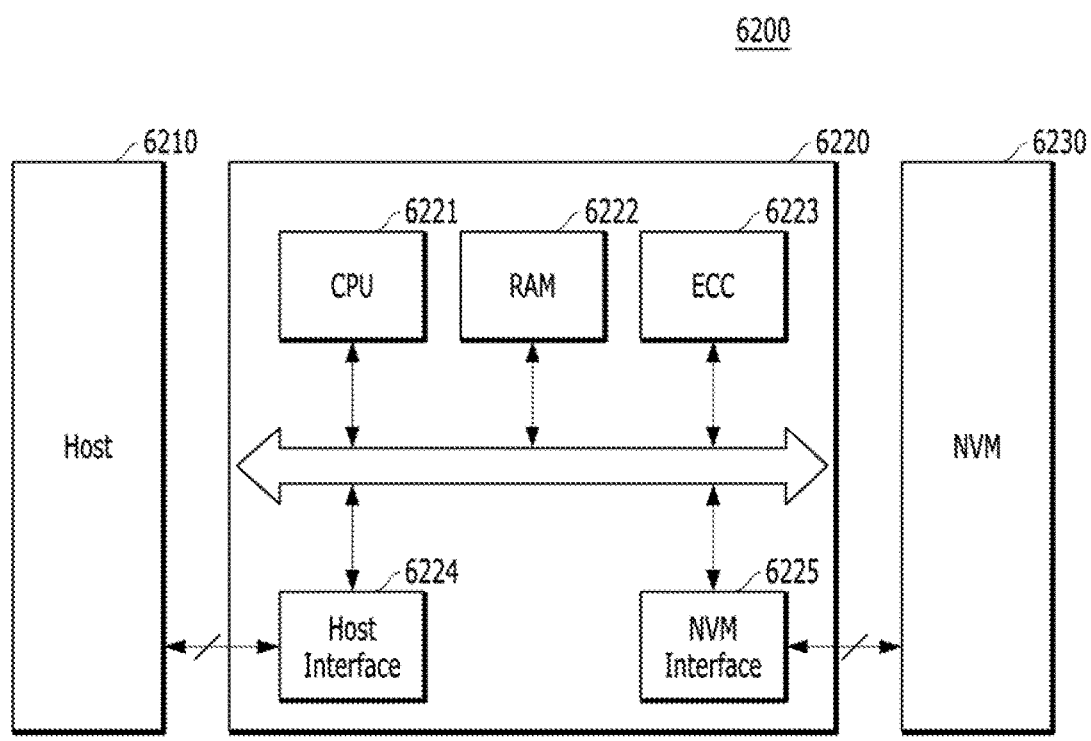
FIG. 8 is a block diagram illustrating a data processing system, according to an embodiment of the present invention.

FIG. 8 is a block diagram illustrating a data processing system, according to an embodiment of the present invention.

Referring to FIG. 8, a data processing system 6200 includes a memory device 6230 which may be implemented with at least one nonvolatile memory (NVM) and a memory controller 6220 for controlling the memory device 6230. The data processing system 6200 may be a storage medium such as a memory card (e.g., CF, SD and microSD), as described above with reference to FIG. 1. The memory device 6230 may correspond to the memory device 150 in the memory system 110 described above with reference to FIG. 1, and the memory controller 6220 may correspond to the controller 130 in the memory system 110 described above with reference to FIG. 1.

The memory controller 6220 may control the operations, including the read, write and erase operations for the memory device 6230 in response to requests received from a host 6210. The memory controller 6220 may include a central processing unit (CPU) 6221, a random access memory (RAM) as a buffer memory 6222, an error correction code (ECC) circuit 6223, a host interface 6224, and an NVM interface as a memory interface 6225, all coupled via an internal bus.

The CPU 6221 may control the operations for the memory device 6230 such as read, write, file system management, bad page management, and so forth. The RAM 6222 may operate according to control of the CPU 6221, and may be used as a work memory, a buffer memory, a cache memory, or the like. In the case where the RAM 6222 is used as a work memory, data processed by the CPU 6221 is temporarily stored in the RAM 6222. In the case where the RAM 6222 is used as a buffer memory, the RAM 6222 is used to buffer data to be transmitted from the host 6210 to the memory device 6230 or from the memory device 6230 to the host 6210. In the case where the RAM 6222 is used as a cache memory, the RAM 6222 may be used to enable the memory device 6230 with a low speed to operate at a high speed.

The ECC circuit 6223 corresponds to the ECC unit 138 of the controller 130 described above with reference to FIG. 1. As described above with reference to FIG. 1, the ECC circuit 6223 may generate an error correction code (ECC) for correcting a fail bit or an error bit in the data received from the memory device 6230. The ECC circuit 6223 may perform error correction encoding for data to be provided to the memory device 6230, and may generate data added with parity bits. The parity bits may be stored in the memory device 6230. The ECC circuit 6223 may perform error correction decoding for data outputted from the memory device 6230. At this time, the ECC circuit 6223 may correct errors by using the parity bits. For example, as described above with reference to FIG. 1, the ECC circuit 6223 may correct errors by using various coded modulations such as of a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM) and a Block coded modulation (BCM).

The memory controller 6220 transmits and receives data to and from the host 6210 through the host interface 6224, and transmits and receives data to and from the memory device 6230 through the NVM interface 6225. The host interface 6224 may be connected with the host 6210 through at least one of various interface protocols such as a parallel advanced technology attachment (PATA) bus, a serial advanced technology attachment (SATA) bus, a small computer system interface (SCSI), a universal serial bus (USB), a peripheral component interconnection express (PCIe) or a NAND interface. Further, as a wireless communication function or a mobile communication protocol such as wireless fidelity (WI-FI) or long term evolution (LTE) is realized, the memory controller 6220 may transmit and receive data by being connected with an external device such as the host 6210 or another external device other than the host 6210. Specifically, as the memory controller 6220 is configured to communicate with an external device through at least one among various communication protocols, the memory system and the data processing system according to the embodiment may be applied to wired/wireless electronic appliances, For example, a mobile electronic appliance.

Figure 9:
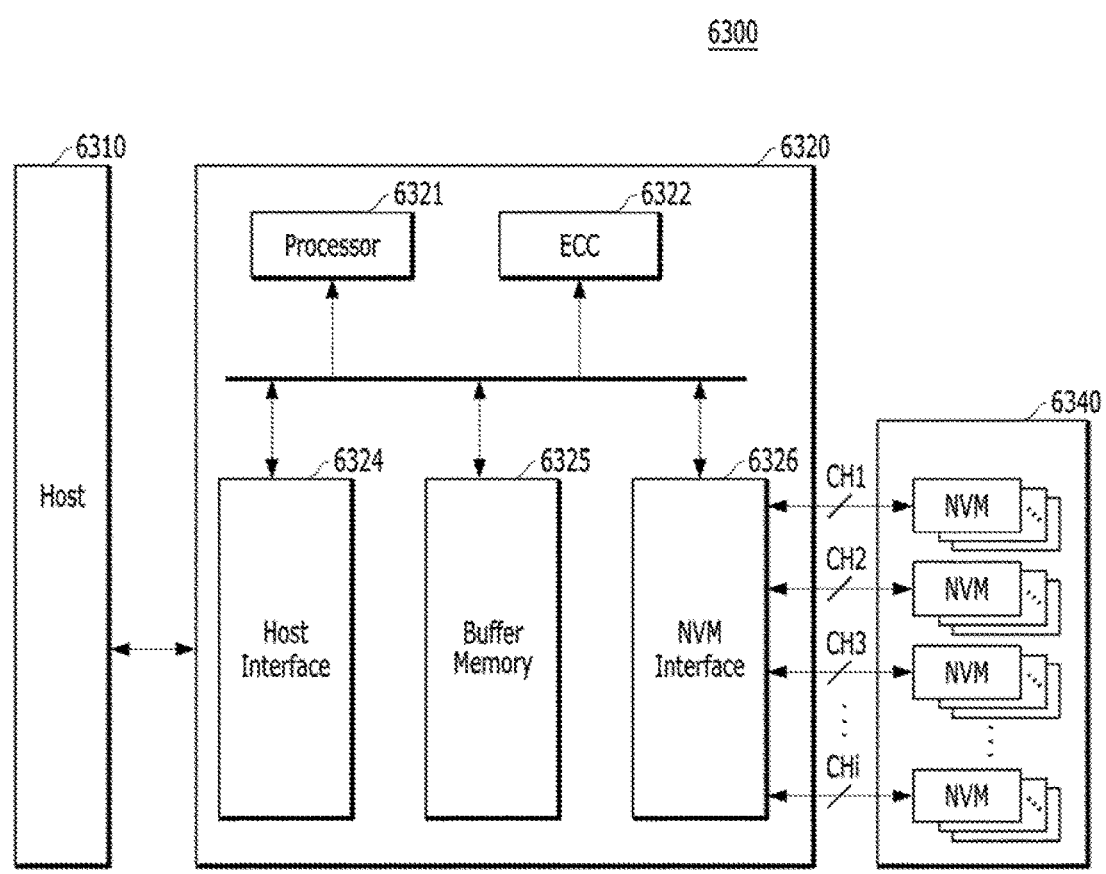
FIG. 9 is a block diagram illustrating a solid state drive, according to an embodiment of the present invention.

FIG. 9 is a block diagram illustrating a solid state drive (SSD), according to an embodiment of the present invention.

Referring to FIG. 9, an SSD 6300 may include a memory device 6340 which may include a plurality of nonvolatile memories NVM, and a controller 6320. The controller 6320 may correspond to the controller 130 in the memory system 110 described above with reference to FIG. 1, and the memory device 6340 may correspond to the memory device 150 in the memory system 110 described above with reference to FIG. 1.

In detail, the controller 6320 may be connected with the memory device 6340 through a plurality of channels CH1, CH2, CH3, . . . and CHi. The controller 6320 may include a processor 6321, a buffer memory 6325, an error correction code (ECC) circuit 6322, a host interface 6324, and a nonvolatile memory (NVM) interface as a memory interface 6326 coupled via an internal bus.

The buffer memory 6325 temporarily stores data received from a host 6310 or data received from a plurality of nonvolatile memories NVMs included in the memory device 6340, or temporarily stores metadata of the plurality of nonvolatile memories NVMs. For example, the metadata may include map data including mapping tables. The buffer memory 6325 may be implemented with a volatile memory such as, but not limited to, a dynamic random access memory (DRAM), a synchronous dynamic random access memory (SDRAM), a double data rate (DDR) SDRAM, a low power double data rate (LPDDR) SDRAM and a graphic random access memory (GRAM) or a nonvolatile memory such as, but not limited to, a ferroelectric random access memory (FRAM), a resistive random access memory (ReRAM), a spin-transfer torque magnetic random access memory (STT-MRAM) and a phase change random access memory (PRAM). While it is illustrated in FIG. 9, for the sake of convenience in explanation, that the buffer memory 6325 is disposed inside the controller 6320, it is to be noted that the buffer memory 6325 may be disposed outside the controller 6320.

The ECC circuit 6322 calculates error correction code values of data to be programmed in the memory device 6340 in a program operation, performs an error correction operation for data read from the memory device 6340, based on the error correction code values, in a read operation, and performs an error correction operation for data recovered from the memory device 6340 in a recovery operation for failed data.

The host interface 6324 provides an interface function with respect to an external device such as the host 6310. The nonvolatile memory interface 6326 provides an interface function with respect to the memory device 6340 which is connected through the plurality of channels CH1, CH2, CH3, . . . and CHi.

As a plurality of SSDs 6300 to each of which the memory system 110 described above with reference to FIG. 1 is applied are used, a data processing system such as a redundant array of independent disks (RAID) system may be implemented. In the RAID system, the plurality of SSDs 6300 and an RAID controller for controlling the plurality of SSDs 6300 may be included. In the case of performing a program operation by receiving a write command from the host 6310, the RAID controller may select at least one memory system (For example, at least one SSD 6300) in response to the RAID level information of the write command received from the host 6310, among a plurality of RAID levels (for example, the plurality of SSDs 6300) and may output data corresponding to the write command, to the selected SSD 6300. In the case of performing a read operation by receiving a read command from the host 6310, the RAID controller may select at least one memory system (For example, at least one SSD 6300) in response to the RAID level information of the write command received from the host 6310, among the plurality of RAID levels (for example, the plurality of SSDs 6300), and may provide data outputted from the selected SSD 6300, to the host 6310.

Figure 10:
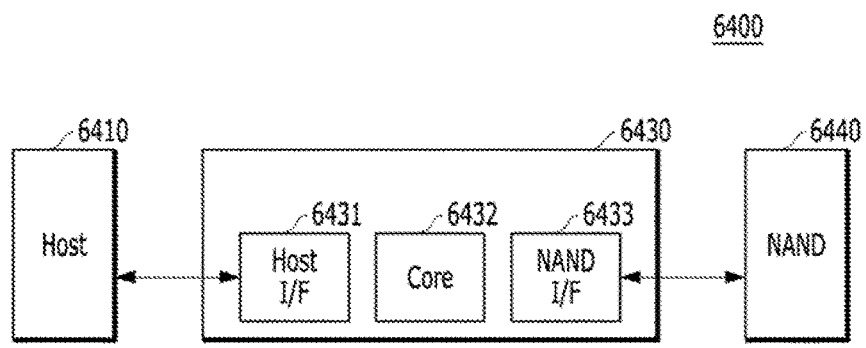
FIG. 10 is a block diagram schematically illustrating an embedded multimedia card (eMMC), according to an embodiment of the present invention.

FIG. 10 is a diagram illustrating another example of a data processing system including the memory system according to an embodiment of the present invention. FIG. 10 is a block diagram schematically illustrating an embedded multimedia card (eMMC), according to an embodiment of the present invention.

Referring to FIG. 10, an eMMC 6400 includes a memory device 6440 which is implemented with at least one NAND flash memory, and a controller 6430. The controller 6430 may correspond to the controller 130 in the memory system 110 described above with reference to FIG. 1, and the memory device 6440 may correspond to the memory device 150 in the memory system 110 described above with reference to FIG. 1.

In detail, the controller 6430 may be connected with the memory device 6440 through a plurality of channels. The controller 6430 may include a core 6432, a host interface 6431, and a memory interface such as a NAND interface 6433.

The core 6432 may control the operations of the eMMC 6400. The host interface 6431 may provide an interface function between the controller 6430 and a host 6410. The NAND interface 6433 may provide an interface function between the memory device 6440 and the controller 6430. For example, the host interface 6431 may be a parallel interface such as an MMC interface, as described above with reference to FIG. 1, or a serial interface such as an ultra-high speed class 1 (UHS-I)/UHS class 2 (UHS-II) and a universal flash storage (UFS) interface.

Figure 11:
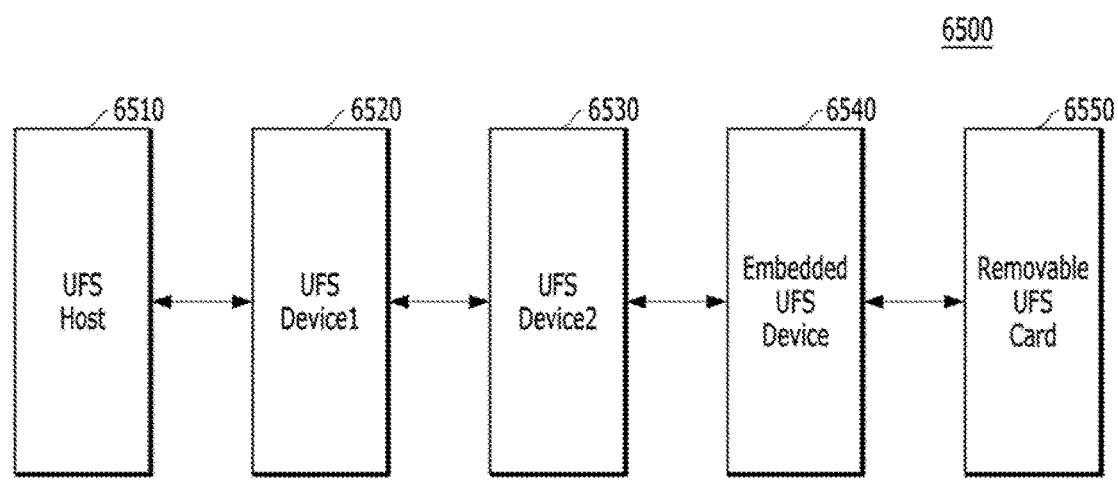
FIG. 11 is a block diagram illustrating a universal flash storage (UFS), according to an embodiment of the present invention.

FIG. 11 is a diagram illustrating another example of a data processing system including a memory system according to an embodiment of the present invention. FIG. 11 is a block diagram illustrating a universal flash storage (UFS), according to an embodiment of the present invention.

Referring to FIG. 11, a UFS system 6500 may include a UFS host 6510, a plurality of UFS devices 6520 and 6530, an embedded UFS device 6540, and a removable UFS card 6550. The UFS host 6510 may be an application processor of wired/wireless electronic appliances, for example, a mobile electronic appliance.

The UFS host 6510, the UFS devices 6520 and 6530, the embedded UFS device 6540 and the removable UFS card 6550 may respectively communicate with external devices such as wired/wireless electronic appliances (for example, a mobile electronic appliance), through a UFS protocol. The UFS devices 6520 and 6530, the embedded UFS device 6540 and the removable UFS card 6550 may be implemented with the memory system 110 described above with reference to FIG. 1, for example, as the memory card system 6100 described above with reference to FIG. 7. The embedded UFS device 6540 and the removable UFS card 6550 may communicate through another protocol other than the UFS protocol. For example, the embedded UFS device 6540 and the removable UFS card 6550 may communicate through various card protocols such as, but not limited to, USB flash drives (UFDs), multimedia card (MMC), secure digital (SD), mini SD and Micro SD.

Figure 12:
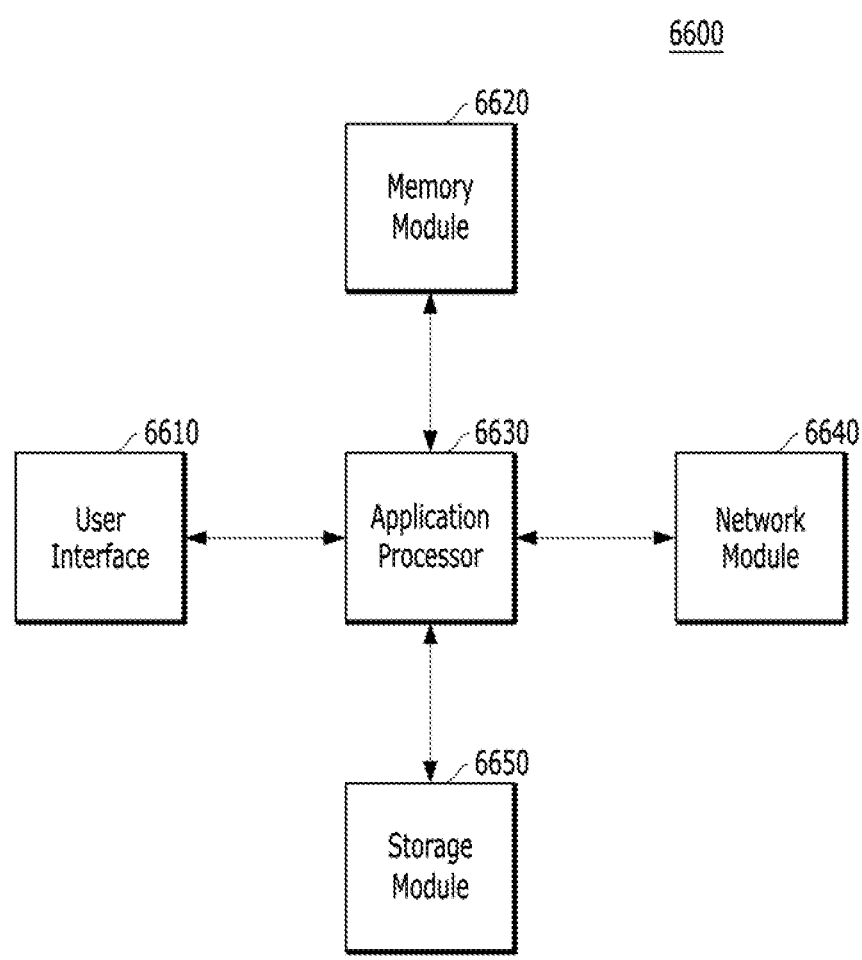
FIG. 12 is a block diagram schematically illustrating a user system including a memory system, according to an embodiment of the present invention.

FIG. 12 is a diagram illustrating an example of a data processing system including the memory system according to an embodiment of the present invention. FIG. 12 is a block diagram schematically illustrating a user system including a memory system, according to an embodiment of the present invention.

Referring to FIG. 12, a user system 6600 may include an application processor 6630, a memory module 6620, a network module 6640, a storage module 6650, and a user interface 6610.

The application processor 6630 may drive components included in the user system 6600 and an operating system (OS). For example, the application processor 6630 may include controllers for controlling the components included in the user system 6600, interfaces, graphics engines, and so on. The application processor 6630 may be provided by a system-on-chip (SoC).

The memory module 6620 may operate as a main memory, a working memory, a buffer memory or a cache memory of the user system 6600. The memory module 6620 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM and an LPDDR3 SDRAM or a nonvolatile random access memory such as a phase change random access memory (PRAM), a resistive random access memory (ReRAM), a magnetic random access memory (MRAM) and a ferroelectric random access memory (FRAM). For example, the application processor 6630 and the memory module 6620 may be mounted by being packaged on the basis of a package-on-package (POP).

The network module 6640 may communicate with external devices. For example, the network module 6640 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WIMAX), wireless local area network (WLAN), ultra-wideband (UWB), Bluetooth, wireless display (WI-DI), and so on, and may thereby communicate with wired/wireless electronic appliances, For example, a mobile electronic appliance. According to this fact, the memory system and the data processing system according to the embodiment may be applied to wired/wireless electronic appliances. The network module 6640 may be included in the application processor 6630.

The storage module 6650 may store data such as data received from the application processor 6530, and transmit data stored therein, to the application processor 6530. The storage module 6650 may be realized by a nonvolatile semiconductor memory device such as a phase-change RAM (PRAM), a magnetic RAM (MRAM), a resistive RAM (ReRAM), a NAND flash memory, a NOR flash memory and a 3-dimensional NAND flash memory. The storage module 6650 may be provided as a removable storage medium such as a memory card of the user system 6600 and an external drive. For example, the storage module 6650 may correspond to the memory system 110 described above with reference to FIG. 1, and may be implemented with the SSD, eMMC and UFS described above with reference to FIGS. 9 to 11.

The user interface 6610 may include interfaces for inputting data or commands to the application processor 6630 or for outputting data to an external device. For example, the user interface 6610 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, a light emitting diode (LED), a speaker and a motor.

In the case where the memory system 110 described above with reference to FIG. 1 is applied to the mobile electronic appliance of the user system 6600 according to an embodiment, the application processor 6630 may control the operations of the mobile electronic appliance, and the network module 6640 as a communication module may control wired/wireless communication with an external device, as described above. The user interface 6610 as the display/touch module of the mobile electronic appliance displays data processed by the application processor 6630 or supports input of data from a touch panel.

Accordingly, a memory system and an operating method thereof are provided having reduced complexity and performance degradation. The memory system and its operating method increase the use efficiency of a memory device included in the memory system, and may more rapidly and stably process data to the memory device.

Although various embodiments have been described for illustrative purposes, it will be apparent to those skilled in the art that various other changes and modifications may be made without departing from the spirit and scope of the invention as defined in the following claims.

What is claimed is:

1. A memory system comprising:
a memory device comprising a plurality of memory blocks, each memory block comprising a plurality of pages;
a controller suitable for performing a command operation on the memory blocks, the command operation including checking one or more parameters of each of the memory blocks, selecting at least one source memory block from the memory blocks according to the checked one or more parameters, and storing data stored in the at least one source memory block in a target memory block among the memory blocks,
wherein the controller selects a first source memory block group from the memory blocks according to a first parameter of the parameters, selects a second source memory block group from the first source memory block group according to a second parameter of the parameters, and selects the source memory blocks from the second source memory block group according to a third parameter of the parameters.

2. The memory system of claim 1, wherein the one or more parameters comprise at least one of a valid page count parameters, an erase count parameters, and an operation parameters of the memory blocks.

3. The memory system of claim 2, wherein the controller checks the number of valid pages among the plurality of pages included in the memory blocks, and then updates the valid page count parameters according to the number of valid pages.

4. The memory system of claim 2, wherein the controller checks a first memory block in which an erase operation was performed, among the memory blocks, according to the erase operation of the command operation, and then updates the erase count parameter of the first memory block.

5. The memory system of claim 2, wherein the controller checks a first memory block in which a program operation or an update program operation was performed, among the memory blocks, according to the program operation or the update program operation of the command operation, and then updates the operation parameter of the first memory block.

6. The memory system of claim 2, wherein the controller checks valid pages corresponding to the valid page count parameters in the memory blocks, checks the maximum value and minimum value of valid data stored in the valid pages, calculates an average of the valid data, and selects the source memory blocks according to the average value.

7. The memory system of claim 6, wherein the controller normalizes data elements of the valid data for selecting the source memory blocks, down-samples the valid data through the normalization, and stores the down-sampled data in the target memory block.

8. The memory system of claim 6, wherein the controller sorts and orders the valid data according to data addresses, and stores the sorted and ordered data in the target memory block.

9. The memory system of claim 1, wherein the controller generates a list by writing the parameters of the memory blocks for the respective indexes of the memory blocks, stores the list in a memory of the controller, and updates the parameters written in the list according to the command operation.

10. An operating method of a memory system, comprising:
   receiving a command from a host, for a plurality of pages included in each of a plurality of memory blocks of a memory device;
   performing a command operation corresponding to the command between a controller of the memory device and the memory blocks;
   checking one or more parameters of each of the memory blocks including to the command operation;
   selecting at least one source memory block from the memory blocks, according to the checked one or more parameters; and
   storing data stored in the at least one source memory block into a target memory block among the memory blocks,
   wherein the selecting of the source memory blocks comprises:
      selecting a first source memory block group from the memory blocks according to a first parameter of the parameters;
      selecting a second source memory block group from the first source memory block group according to a second parameter of the parameters; and
      selecting the source memory blocks from the second source memory block group according to a third parameter of the parameters.

11. The operating method claim 10, wherein the one or more parameters comprise at least one of a valid page count parameters, an erase count parameters and an operation parameters of the memory blocks.

12. The operating method of claim 11, further comprising:
   checking the number of valid pages in the plurality of pages included in the memory blocks; and
   updating the valid page count parameters according to the number of valid pages.

13. The operating method of claim 11, further comprising:
   checking a first memory block in which an erase operation was performed, among the memory blocks, according to the erase operation of the command operation; and
   updating the erase count parameter of the first memory block.

14. The operating method of claim 11, further comprising:
   checking a first memory block in which a program operation or an update program operation was performed, among the memory blocks, according to the program operation or the update program operation of the command operation; and
   updating the operation parameter of the first memory block.

15. The operating method of claim 11, wherein the selecting of the source memory blocks comprises:
   checking valid pages corresponding to the valid page count parameters in the memory blocks;
   checking the maximum value and minimum value of valid data stored in the valid pages, and calculating an average of the valid data; and
   selecting the source memory blocks according to the average value.

16. The operating method of claim 15, wherein the selecting of the source memory blocks further comprises normalizing data elements of the valid data for selecting the source memory blocks, and
   the storing of the data comprises down-sampling the valid data through the normalization and storing the down-sampled data in the target memory block.

17. The operating method of claim 15, wherein the storing of the data comprises sorting and ordering the valid data according to data addresses, and storing the sorted and ordered data in the target memory block.

18. The operating method of claim 10, further comprising:
   generating a list by writing the parameters of the memory blocks for the respective indexes of the memory blocks;
   storing the list in a memory of the controller; and
   updating the parameters written in the list according to the command operation.

* * * * *